United States Patent
Winterhalder et al.

(10) Patent No.: US 6,237,498 B1
(45) Date of Patent: May 29, 2001

(54) PYROTECHNICAL INFLATOR AND METHOD OF MAKING SAME

(75) Inventors: Marc Winterhalder, Garching/Alz; Paul Adam, Viehausen; Martin Fink, Unterbernbach; Markus Leifheit, Moosinning, all of (DE)

(73) Assignee: TRW Airbag Systems GmbH & Co., KG, Aschau Am Inn (DE)

( * ) Notice: Subject to any disclaimer, the term of this patent is extended or adjusted under 35 U.S.C. 154(b) by 0 days.

(21) Appl. No.: 09/111,134

(22) Filed: Jul. 3, 1998

(30) Foreign Application Priority Data

Jul. 3, 1997 (DE) .............................. 197 28 438

(51) Int. Cl.[7] .................................... B60R 21/26
(52) U.S. Cl. .......................... 102/530; 280/741
(58) Field of Search ................ 102/202, 202.5, 102/202.12, 530, 531; 280/741, 737

(56) References Cited

U.S. PATENT DOCUMENTS

| | | | |
|---|---|---|---|
| 2,979,896 | * | 4/1961 | Perkins, Jr. et al. . |
| 3,066,014 | * | 11/1962 | White et al. . |
| 3,877,882 | * | 4/1975 | Lette et al. . |
| 3,891,233 | * | 6/1975 | Damon . |
| 3,904,221 | * | 9/1975 | Shiki et al. . |
| 3,972,545 | * | 8/1976 | Kirchoff et al. . |
| 4,066,415 | * | 1/1978 | Kasama et al. . |
| 4,109,578 | * | 8/1978 | Goetz . |
| 4,158,696 | | 6/1979 | Wilhelm . |
| 4,530,516 | * | 7/1985 | Adams et al. . |
| 4,561,675 | * | 12/1985 | Adams et al. . |
| 4,878,690 | * | 11/1989 | Cunningham . |
| 5,219,178 | | 6/1993 | Kobari et al. . |
| 5,255,938 | * | 10/1993 | Brede et al. . |
| 5,387,009 | | 2/1995 | Lauritzen et al. . |
| 5,447,105 | * | 9/1995 | Bauer et al. . |
| 5,499,843 | * | 3/1996 | Faigle et al. . |
| 5,586,783 | * | 12/1996 | Adams et al. . |

FOREIGN PATENT DOCUMENTS

2158526 * 11/1971 (DE) ................................. 102/741

* cited by examiner

Primary Examiner—Robert P. Swiatek
(74) Attorney, Agent, or Firm—Tarolli, Sundheim, Covell, Tummino & Szabo L.L.P.

(57) ABSTRACT

An inflator, more particularly for a vehicle occupant restraint system, has a tubular inflator housing which is closed off at its end faces and has radial exit ports via which the gas is able to exit the inflator. The inflator housing has in its interior at least one combustion chamber packed with propellant, at least one ignition unit for igniting the propellant in the combustion chamber and at least one filter which is located upstream of the exit ports. A filter insert featuring an outer housing is provided, the outer housing having a plurality of housing parts which at least partly surround the filter disposed in the filter insert. The outer housing together with its housing parts is radially secured to the inflator housing without the provision of an axial stop. The outer geometry of the outer housing and the inner geometry of the inflator housing permit total insertion of the outer housing or its housing parts in the axial direction into the inflator housing to different insertion depths when the outer housing is still in the non-secured condition.

22 Claims, 4 Drawing Sheets

PYROTECHNICAL INFLATOR AND METHOD OF MAKING SAME

FIELD OF THE INVENTION

The invention relates to an inflator, more particularly for a vehicle occupant restraint system. The invention further relates to a method of making an inflator.

BACKGROUND OF THE INVENTION

Known tubular inflators for inflating gas bags in vehicles are usually configured single-stage or two-stage. The expense of their fabrication is relatively high, this being due to the fact that totally different designs are provided for single-stage and two-stage inflators. Tubular inflators are mainly provided for restraint systems on the front passenger side since their outer geometry is best suited for accommodation in the dashboard.

One highly complicated two-stage tubular inflator configuration is evident from U.S. Pat. No. 5,033,390. In this arrangement, at the two axial ends of the inflator housing combustion chambers are provided between which two expansion spaces are arranged. These two expansion spaces separated from each other are formed by two outer disks and an intermediate disk formed integrally on an anchor adjoining the outer disks. In addition to this, elongated tubes are screwed into place axially from without, which comprise a booster charge in their interior and are connected with axial covers which seal off the two-part tubular housing at the end faces. Moreover, the tubular housing has in its interior axial stops for positioning the disks. When an inflator is to be produced which has larger or smaller combustion chambers, the housing and anchor parts need to be redimensioned. This makes the use of like parts very difficult. It will also be readily appreciated that this complicated structure makes fabricating the inflator relatively expensive. On top of this the individual parts do not lend themselves to be also put to use in single-stage inflators. The same drawbacks are exhibited by the inflator disclosed in U.S. Pat. No. 5,219,178, in which all parts inserted in the tubular housing adjoin each other axially and fix each other in position.

SUMMARY OF THE INVENTION

The invention provides an inflator the design principle of which permits simple, cost-effective manufacture of both a single-stage and a two-stage or multi-stage version. The basic principle of the invention results in a kind of modular system in which numerous parts in the single-stage or multi-stage version are the same. In addition to this, the inflator in accordance with the invention enables the inflator output to be varied by simple means without necessitating any basic change in design or a different dimensioning of the individual parts. The inflator according to the invention for a vehicle occupant restraint system comprises a tubular inflator housing including opposite end faces at which it is closed off and having radial exit ports via which the gas is able to exit the inflator, and having in its interior at least one combustion chamber packed with propellant, at least one ignition unit for igniting the propellant in the combustion chamber and at least one filter being located upstream of the exit ports. The inflator further includes a filter insert featuring an outer housing having a plurality of housing parts which at least partly surround the filter disposed in the filter insert. In a condition in which the outer housing is secured to the inflator housing, hereinafter referred to as secured condition, the outer housing, together with its housing parts, is radially secured to the inflator housing without the provision of an axial stop. The outer geometry of the outer housing and the inner geometry of the inflator housing, however, permit total insertion of the outer housing or its housing parts in the axial direction into the inflator housing to different insertion depths when the outer housing is still in a non-secured condition. Whereas in the prior art provision is always made for axial stops at the housing parts and for parts which are adapted to a specific combustion chamber size, the present invention provides for insertion of the outer housing or the housing parts of the filter insert into the inflator housing to different insertion depths without the provision of an axial stop prior to securing the outer housing and the inflator housing. The filter insert can thus be positioned within the inflator housing at any required position and subsequently secured thereto. When a single-stage inflator is to be manufactured, the insert is inserted into the inflator housing configured tubular only to such an extent that it is located at one end of the inflator. For a multi-stage inflator, practically the same inflator housing can be made use of and, where necessary, also the same insert, except for minor modifications, which is then simply inserted deeper into the inflator housing and secured thereto. Depending on whether the filter insert is located in the middle between the ends of the inflator housing or nearer to one end thereof, combustion chambers the same or different in size can be provided adjoining the filter insert. Changing the volume of the combustion chamber in this way necessitates no change to the geometry of the parts, this also applying to a single-stage inflator in accordance with the invention in which, for downsizing the output, the filter insert merely needs to be inserted deeper into the inflator housing otherwise dimensioned the same. This results in enhanced variability as regards the combustion chamber volumes and it being made easy to adapt the inflator output to specific customer requirements. High component correspondence and low number of components required result in low costs per item, while the preassembling capability of the insert facilitates assembly and helps in reducing costs.

When by contrast the volume of one or both combustion chambers needs to be changed in the case of the inflator known from U.S. Pat. No. 5,033,390, then both tubes to be assembled to form the inflator housing as well as the many axial connecting parts arranged internally need to be totally adapted.

Preferably, the entire filter insert forms a preassembled unit which is inserted in the inflator housing. But it is also possible for the filter insert to be assembled when it is already in the inflator housing. This can be done for example in that the outer housing has two end face walls which only partly surround the filter (at the end faces) and clamp the filter inbetween and which are inserted from opposite axial openings provided in the tubular inflator housing. Preferably, a press fit is provided between the inflator housing and the outer housing so as to fix the filter insert or its housing parts to some extent during insertion.

In the preferred embodiment of the invention the insert also has at least one expansion space in its interior.

When the inflator in accordance with the invention is configured as a single-stage inflator, the insert is provided, as mentioned, at one axial end of the inflator housing, it sealing off the latter from without at this end.

Another possibility of reducing the number of parts employed consists in the inflator comprising an insert with an ignition unit extending axially through the latter into the combustion chamber. The inserts with and without ignition unit hardly differ from each other. Depending on the desired installation position or the ambient circumstances, for example, the insert with the ignition unit is inserted at the side of the inflator having more facilitated access and the insert without ignition unit at the other side. As a result of this modular system various configurations can be achieved at no additional expense in design or fabrication. If the inflator in accordance with the invention is configured multi-stage, then, as mentioned, the insert is simply inserted in the inflator housing so far that it is located between two combustion chambers. If an insert is employed which is open at both end faces then the insert may serve as the filter insert for both combustion chambers. Should several filter inserts or expansion spaces be needed, then, for example, two inserts may be inserted one after the other, one of which is furnished with an end face wall which is closed off relative to the other insert, as a result of which the combustion chambers are separated from each other.

In addition, the present invention provides a method of making an inflator in accordance with the invention, the method providing a modular system for single-stage and multi-stage tubular inflators of different outputs. The method according to the invention provides that starting from an axial opening in the inflator housing the outer housing of the filter or the housing parts is/are inserted to the desired depth, that the outer geometry of the outer housing and the inner geometry of the inflator housing are so adapted to each other that an even deeper insertion would be possible, that the combustion chamber is packed with a propellant and that a cover is arranged on the end face of the inflator housing for closing the combustion chamber.

In the method according to the invention there is also the provision that the filter insert forms a separate preassembled unit or that the housing parts of the outer housing are inserted and thus joined together. This may be done, for example, by the provision of two end face walls and a filter, the end face walls being inserted from opposite axial openings in the inflator housing and clamping the filter or, to put it more generally, a shell part having gas exit ports, between them.

DETAILED DESCRIPTION OF PREFERRED EMBODIMENTS

Figure 1:
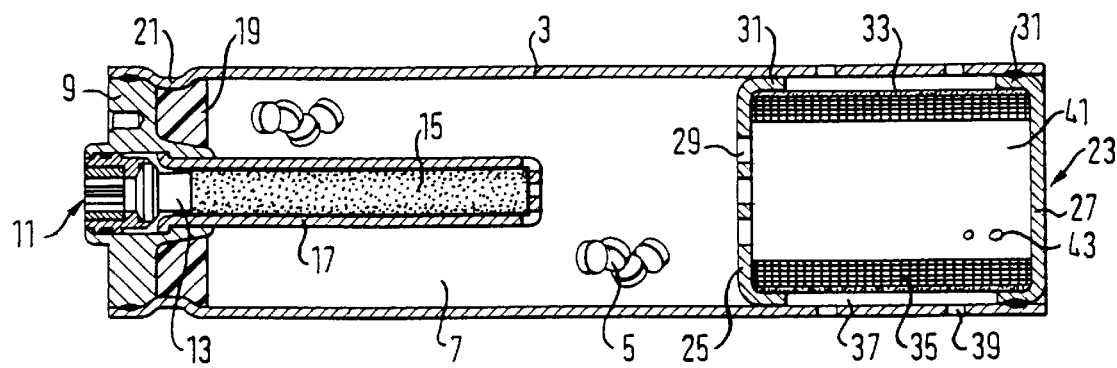
FIG. 1 is a longitudinal section view of a first embodiment of the inflator in accordance with the invention, configured single-stage and fabricated using the method in accordance with the invention.

The invention will now be described in detail with reference to the embodiments shown in the drawings.

In FIG. 1 a tubular inflator for inflating a front passenger gas bag (not shown) is illustrated. This inflator has a tubular inflator housing 3 with a combustion chamber 7 packed with propellant 5 in its interior. At its end faces the inflator housing 3 is closed off gas-tight by two covers. The cover 9 shown on the left in FIG. 1 comprises an elongated ignition unit 11 extending into the combustion chamber 7, this ignition unit being secured to the cover 9. The ignition unit 11 comprises an igniter 13 and a booster charge 15 adjoining the latter. The booster charge 15 is arranged in an elongated tube 17. The cover 9 is secured to the housing 3 by welding. An elastic disk 19 for pretensioning the propellant 5 is positioned in the inflator housing 3 by an indentation 21 on all sides. By means of an additional such indentation, for instance, the filter insert 23 may also be positioned in one direction. A filter insert 23 configured as a preassembled unit is inserted in the inflator housing 3 at the axial end of the inflator housing opposite the cover.

The filter insert 23 has an outer housing having two opposite pot-shaped end face walls 25, 27. The interior end face wall 25 defines the combustion chamber 7 at the right-hand end face of the latter. Ports 29 in the end face wall 25 permit passage of the generated gas, as will be explained in more detail in the following. Annular shell sections 31 of the end face walls facing each other sealingly contact the inside of the inflator housing 3. A supporting ring 33 which is gas permeable and is made of a perforated plate or a wire mesh is inserted by its radial ends into the end face walls 25, 27 and contacts the shell sections 31 at their inner faces by a press fit so that this supporting ring connects the end face walls 25, 27 to each other. A tubular filter 35 contacts the supporting ring 33 again on the inside.

Between the supporting ring 33 and the inflator housing 3, a first annular expansion space 37 materializes. Several gas exit ports 39 distributed circumferentially guide the compressed gas into the gas bag in the case of restraint.

The end face wall 27 features no gas exit ports, it instead closing off the interior of the inflator at the right-hand axial end. Not shown are insulations which close off the ports 29 and/or the gas exit ports 39 to prevent the ingress of moisture.

The interior of the filter insert 22 is hollow so that a second expansion space 41 is formed.

Due to its outer geometry being precisely adapted to the inner geometry of the inflator housing 3, the filter insert 23 can be inserted to any desired depth in the inflator housing 3, without parts dimensioned otherwise being necessary, because no axial stops are provided for positioning the filter insert. Inserting the filter insert more or less deeply into the inflator housing enables the combustion chamber volume to be varied by simple means and the output of the inflator to be adapted to the specifications of the vehicle manufacturer. Once the filter insert has been inserted and positioned, the outer housing and the inflator housing are secured to each other from outside (e.g. by calking and/or welding), propellant is introduced, and the cover 9 on the end face which closes the combustion chamber 7 is secured to the inflator housing 3. Despite differences in the combustion chamber volume corresponding inflators can be fabricated in one and the same production line by very simple means.

When the vehicle is involved in a collision, the igniter 13 is activated via a sensor system (not shown). Via the booster charge 15 the propellant 5 is ignited so that hot gas materializes intermingled with particles and condensatable constituents. After opening of the insulation, the hot gas flows through the ports 29 into the second expansion space 41, the end face wall 25 already acting as a kind of prefilter in this case. In the second expansion space 41 cooling of the gas takes place. Part of the condensatable constituents of the gas is separated out and retained, like the particles, in the filter 35. In the expansion space 41, the gas flow is moderated and the gas is distributed evenly. The first expansion space 37 ensures that the flow passes the filter 35 over practically its full surface area in the radial direction and that no axial flow occurs in the filter. The cooled and filtered gas re-expands in the expansion space 37 and gains access to the gas bag through the gas exit ports 39.

In the expansion spaces 37, 41, to attain subsequent reaction of gas constituents and a chemical conversion of some of them, a catalytically acting material 43 may be employed, by means of which a reduction of the noxious emissions contained in the generated gas, or more precisely the generated gas mixture, is achieved. This ensures a reduction of the gases generated on combustion of the propellant 5.

Figure 2:
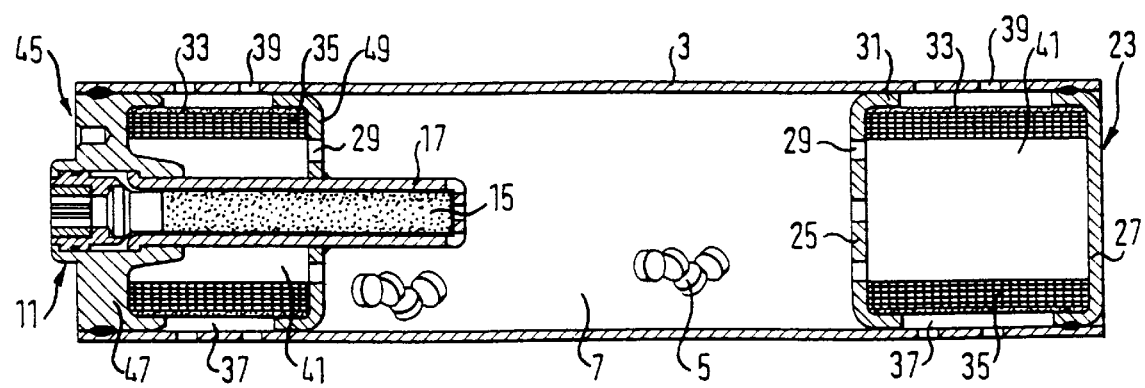
FIG. 2 shows a second embodiment of the inflator in accordance with the invention in which as compared to the embodiment as shown in FIG. 1 also the ignition unit is part of an insert.

The embodiment depicted in FIG. 2 differs from that shown in FIG. 1 by two filter inserts being provided instead of one. The filter insert 23 provided at the right-hand end corresponds to the filter insert 23 as shown in FIG. 1 so that there is no need to detail this. The left-hand filter insert 45 has a design configuration similar to that of filter insert 23. Accordingly, like components are identified by like reference numerals. However, integrated in the filter insert 45 is the ignition unit 11 which is configured the same as the ignition unit 11 shown in FIG. 1. For its locking, the outer end face wall 47 is formed thicker than the end face wall 27. The inner end face wall 49 corresponds to the end face wall 25, the tube 17 of the ignition unit passing through a central opening, however, to protrude into the combustion chamber 7. The filter insert 45, too, may be inserted to any desired depth in the inflator housing 3. Ports 39 at the left-hand end of the inflator housing 3 are flowingly connected to the two expansion spaces 37, 41 which are defined by the filter insert 45.

On activation of the inflator as shown in FIG. 2, the gas generated flows through both the left-hand and right-hand filter inserts 45 and 23, respectively, as well as via the expansion spaces 41, the filters 35, the expansion spaces 37 and the gas exit ports 39 into the gas bag. Due to the gas exit ports 39 being arranged symmetrically at both ends of the inflator, the gas bag is pressurized evenly so that wobbling of the gas bag during inflation as observed in the case of inflators having a non-symmetrical gas exit is avoided.

To improve the filter effect the expansion spaces 37 and/or 41 may even be fully packed with filter material.

Figure 3:
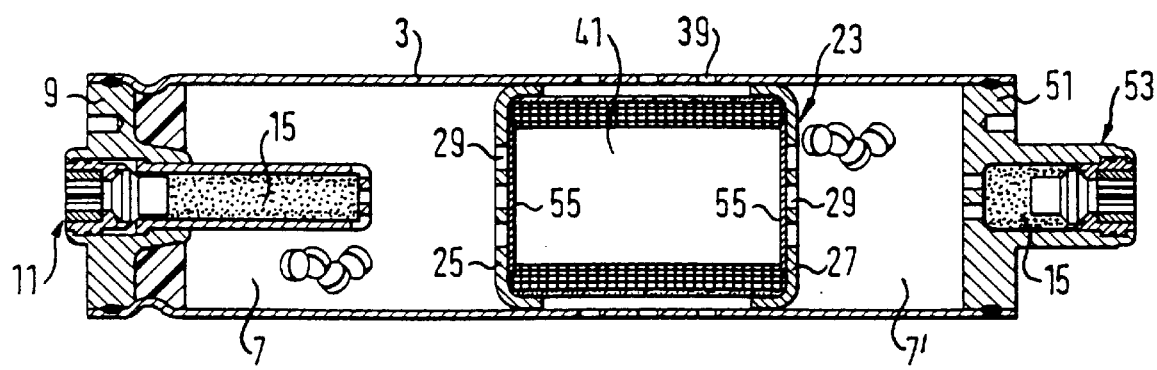
FIG. 3 shows a third embodiment of the inflator in accordance with the invention, configured two-stage.

The inflator as shown in FIG. 3 is configured two-stage. To form two combustion chambers 7, 7' a filter insert 23 common to both combustion chambers is shifted roughly up to the middle of the inflator housing 3. The filter insert 23 differs from that as shown in FIG. 1 merely by the right-hand end face wall 27 also being provided with ports 29, i.e. configured identical to the end face wall 25. By inserting the filter insert 23 into the inflator housing 3 to differing depths, the ratio of the combustion chamber volume can be varied without parts dimensioned differingly being necessary for this purpose. At the left-hand end of the inflator, a cover 9 with an ignition unit 11 is provided, the configuration of the latter corresponding to that of the cover 9 with the integrated ignition unit as shown in FIG. 1. At the right-hand end face, the inflator is closed off by a cover 51 having an integrated ignition unit 53, the booster charge 15 surrounding the igniter 13 and not protruding from the cover 51, but flowingly connected to the combustion chamber 7 via ports in the cover inner wall.

If only one stage is to be ignited, an accidental ignition transfer must be avoided, i.e. the hot gases generated in the one combustion chamber must not flow over into the other combustion chamber. For this purpose burst disks 55 are secured, preferably by welding, adjacent to the inner side of the end face walls 25, 27, closing off the ports 29 and capable of being opened in one direction only. These burst disks 55 simultaneously serve as insulants.

Figure 4A:
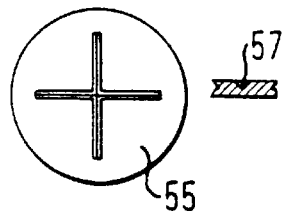
FIGS. 4a and 4b illustrate various embodiments of burst disks usable in the case of the insert shown in FIG. 3.
Figure 4B:
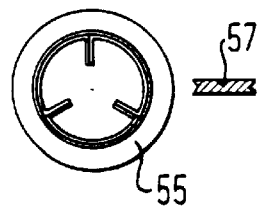

Embodiments of the burst disks 55 are illustrated in FIGS. 4a and 4b. Cross-sectionally V-shaped indentations 57 may be oriented in the shape of a cross or a circle with radial sections to facilitate opening the burst disk 55. The left-hand burst disk 55 is opened only when gas is generated in the combustion chamber 7 and the right-hand burst disk 55 only when gas is generated in the combustion chamber 7'. After for instance the left-hand burst disk 55 has been opened, the gas gains access to the expansion space 41. The increase in pressure in the expansion space 41 results in the right-hand burst disk 55 being pressed against the end face wall 27 from which it cannot be released or destroyed.

Figure 5:
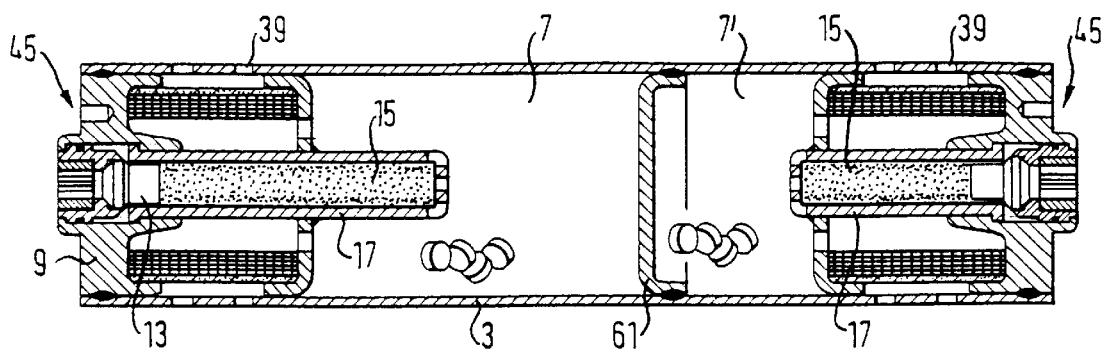
FIG. 5 shows a fourth embodiment of the inflator in accordance with the invention, configured two-stage.

The two-stage inflator shown in FIG. 5 comprises one filter insert 45 at both of its axial ends, each insert having an integrated ignition unit as is evident from FIG. 2. The left-hand and the right-hand filter insert 45 differ merely by the dimension of the booster charges 15 which are adapted to the volume of the assigned combustion chambers 7, 7'. Unlike the embodiment as shown in FIG. 3 the two combustion chambers 7, 7' are not spaced away from each other by a filter insert but by a partition wall 61, this partition wall 61 corresponding to the end face wall 27 as shown in FIG. 1. The ports 39 are arranged in the region of the axial ends of the inflator housing 3 and not, as in the embodiment shown in FIG. 3, roughly in the middle of the inflator housing. The partition wall 61 can be inserted into the inflator housing 3 to differing depths to vary the ratio of the combustion chamber volumes, similar to the situation as with the insert 23 as shown in FIG. 3. The partition wall 61 is connected to the inflator housing 3 by welding. So that, irrespective of whether a single-stage or a two-stage inflator having one or more filter inserts is to be fabricated, always the same inflator housing 3 can be used, the ports 39 are not produced until the filter inserts or covers have been inserted.

Figure 6:
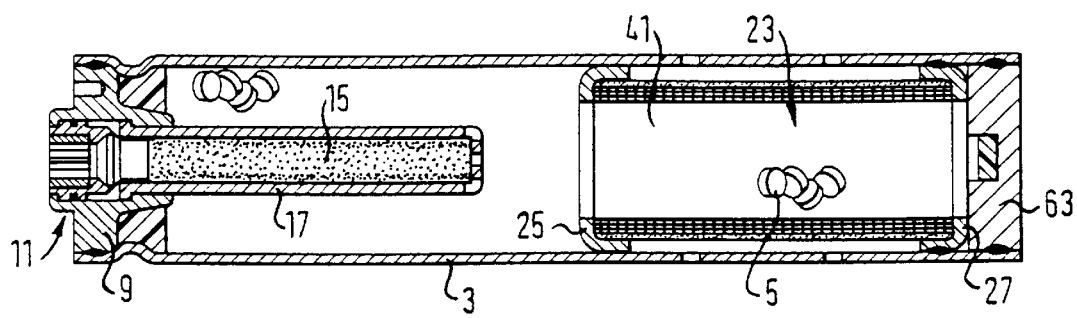
FIG. 6 shows a fifth embodiment of the inflator in accordance with the invention, configured single-stage and in which the interior of the insert is packed with propellant.

The inflator as shown in FIG. 6 differs from those as already shown by an extra-long filter insert 23 being provided, the end face walls 25, 27 of which have a central, large port. The expansion space 41 is packed with propellant 5 and thus is no longer acting as an expansion space. By this design, the output of the inflator can be increased relative to its constructional space. At the left-hand end the inflator is closed off by a cover 9 having an ignition unit 11 as already explained above, and at the right-hand end a separate cover 63 is provided. The cover 63 is in direct contact with the filter insert 23, is inserted into the inflator housing 3 and is welded thereto.

Figure 7:
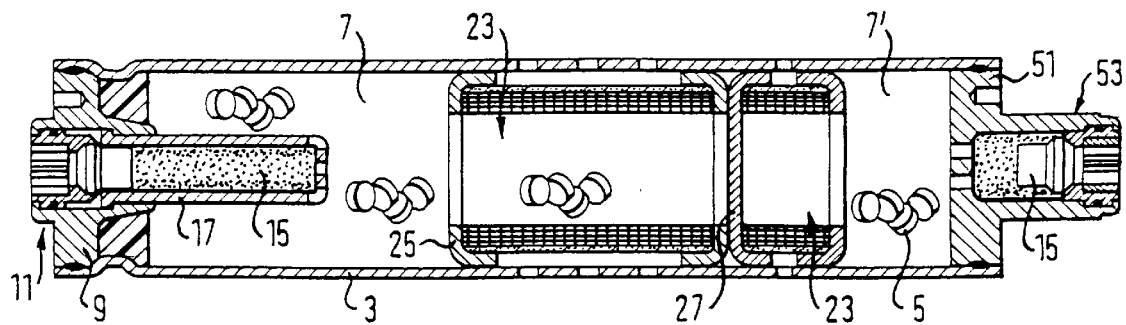
FIG. 7 shows a sixth embodiment of the inflator in accordance with the invention, configured two-stage and featuring two inserts packed with propellant.

Instead of one filter insert 23, two filter inserts 23 may be provided as is evident from FIG. 7 representing a two-stage inflator. In this arrangement, the left-hand filter insert 23 corresponds to that shown in FIG. 6. The right-hand axially shorter filter insert 23 comprises a closed end face wall 27 adjoining the left-hand filter insert 23, this wall separating the two combustion chambers 7, 7' from each other.

Figure 8:
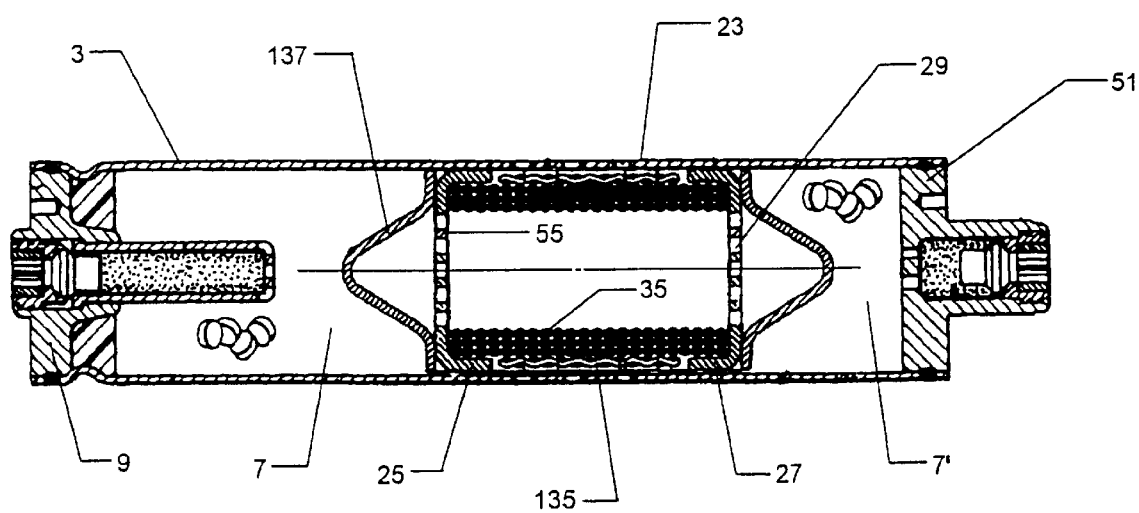
FIG. 8 shows a seventh embodiment of the inflator in accordance with the invention, configured two-stage and having an intermediate filter on either side.

The embodiment as shown in FIG. 8 largely corresponds to that illustrated in FIG. 3, the only difference residing in the configuration of the filter insert 23. The filter insert comprises the pot-shaped end face walls 27 and 25 and is no preassembled unit. Rather, the housing parts are inserted into the inflator housing 3 one after the other and are thereby joined together. The filter insert 23 further includes no supporting ring 33. The filter 35 is clamped axially between the end face walls 25, 27. A further filter 135 is provided radially outside the filter 35. A conical intermediate filter 137 extends from each end face wall 25, 27 into the combustion chambers 7, 7' and divides the latter into two sections. The intermediate filters 137 serve to prevent the filter 35 from being clogged by slag particles developing on ignition of the propellant.

The filter insert 23 is assembled as follows: Starting from the right-hand axial opening in the inflator housing 3 the end face wall 27 is inserted to the desired depth together with the intermediate filter 137, a press fit being provided between the end face wall 27 and the inflator housing 3 which serves to facilitate positioning the end face wall. Starting from the left-hand axial opening the left-hand end face wall 25 is then inserted together with the filters 35, 135 and the intermediate filter 137. Subsequently, the end face walls are calked with the inflator housing 3 from outside by applying a radial force to the latter. It is also possible to weld the end face walls 25, 27 to the inflator housing from without or from within via the axial openings in the inflator housing, for instance by use of laser beams.

Due to the filter inserts being shiftable, the combustion chamber volume, or in the case of two-stage inflators also the volume ratio, can be adjusted as desired and very easily. Furthermore, a kind of modular system materializes which is characterized by numerous parts being identical. Due to this modular system, single-stage or two-stage inflators differing in output can be produced in one and the same production line.

What is claimed is:

1. An inflator, for a vehicle occupant restraint system, comprising a tubular inflator housing including opposite end faces at which it is closed off and having radial exit ports via which gas is able to exit said inflator, said inflator housing further having in its interior at least one combustion chamber packed with propellant, at least one ignition unit for igniting said propellant in said at least one combustion chamber and at least one filter located upstream of said exit ports, and further comprising at least one filter insert featuring an outer housing, said outer housing having a plurality of housing parts which at least partly surround said at least one filter disposed in said at least one filter insert, in a secured condition of said outer housing, said outer housing, together with its housing parts, being radially secured to said inflator housing without the provision of an axial stop, said outer housing having an outer geometry and said inflator housing having an inner geometry which permit total insertion of either of said outer housing and its housing parts in the axial direction into said inflator housing to different insertion depths when said outer housing is still in a non-secured condition.

2. The inflator as set forth in claim 1, wherein said filter insert forms a preassembled unit.

3. The inflator as set forth in claim 1, wherein said interior of said filter insert has an expansion space into which generated gas flows and from which it flows further into said filter.

4. The inflator as set forth in claim 1, wherein said filter insert is packed with propellant.

5. The inflator as set forth in claim 1, wherein a further expansion space is provided radially between said filter which is cross-sectionally ring-shaped and said inflator housing.

6. The inflator as set forth in claim 1, wherein said outer housing consists of two end face walls which clamp said filter between them.

7. The inflator as set forth in claim 6, wherein said end face walls are pot-shaped, wherein at least one end face wall defines said combustion chamber and is provided with at least one port for gas generated in said combustion chamber, said pot-shaped end face walls having ring-shaped shell sections facing each other.

8. The inflator as set forth in claim 7, wherein said port is closed off by a burst disk to prevent the ingress of moisture into said combustion chamber.

9. The inflator as set forth in claim 6, wherein said at least one end face wall has at least one port for gas generated in said combustion chamber and wherein an intermediate filter extends from said end face wall into said combustion chamber and divides said combustion chamber into two sections.

10. The inflator as set forth in claim 1, wherein said outer housing consists of two end face walls and a gas-permeable supporting ring connecting said end face walls to each other.

11. The inflator as set forth in claim 1, wherein said filter insert is provided at one axial end of said inflator housing and wherein said end face wall thereof facing outwards is closed and seals off said interior of said inflator housing toward the outside at this end.

12. The inflator as set forth in claim 11, wherein said filter insert provided at one axial end comprises said ignition unit extending axially therethrough into said combustion chamber.

13. The inflator as set forth in claim 12, wherein said inflator comprises at one axial end a first filter insert with an ignition unit and at the other end a second filter insert with no ignition unit.

14. The inflator as set forth in claim 13, wherein said filter inserts define between them a combustion chamber.

15. The inflator as set forth in claim 1, wherein said inflator is configured multi-stage.

16. The inflator as set forth in claim 15, wherein a plurality of combustion chambers are separated from each other by at least one insert without an ignition unit.

17. The inflator as set forth in claim 16, wherein two combustion chambers have a common filter insert provided inbetween into which gas generated in said combustion chambers is insufflated.

18. The inflator as set forth in claim 16, wherein two adjoining filter inserts are provided between two combustion chambers, of which at least one insert comprises a closed end face wall adjoining said other insert.

19. The inflator as set forth in claim 15, wherein a partition wall having a pot-shaped configuration is arranged between said combustion chambers.

20. The inflator as set forth in claim 19, wherein said partition wall is a separate part secured to said inflator housing and adapted to be shifted in the axial direction prior to being secured.

21. The inflator as set forth in claim 1, wherein a catalytically acting material for reduction of noxious emissions contained in said gas generated on combustion of said propellant is present in said filter insert.

22. The inflator as set forth in claim 1 wherein a press fit is provided between said outer housing and said inflator housing for fixing said outer housing in place after insertion and prior to it being secured.

\* \* \* \* \*